United States Patent
Son et al.

(10) Patent No.: US 12,266,788 B2
(45) Date of Patent: Apr. 1, 2025

(54) CATHODE FOR LITHIUM SECONDARY BATTERY, MANUFACTURING METHOD THEREFOR, AND LITHIUM SECONDARY BATTERY COMPRISING SAME

(71) Applicants: Samsung SDI Co., Ltd., Yongin-si (KR); Seoul National University R&DB Foundation, Seoul (KR)

(72) Inventors: Dongho Son, Yongin-si (KR); Kisuk Kang, Seoul (KR); Kijun Kim, Yongin-si (KR); Jiwon Park, Seoul (KR)

(73) Assignees: Samsung SDI Co., Ltd., Yongin-si (KR); Seoul National University R&DB Foundation, Seoul (KR)

( * ) Notice: Subject to any disclaimer, the term of this patent is extended or adjusted under 35 U.S.C. 154(b) by 694 days.

(21) Appl. No.: 17/595,827

(22) PCT Filed: May 21, 2020

(86) PCT No.: PCT/KR2020/006667
§ 371 (c)(1),
(2) Date: Nov. 24, 2021

(87) PCT Pub. No.: WO2020/242138
PCT Pub. Date: Dec. 3, 2020

(65) Prior Publication Data
US 2022/0328807 A1    Oct. 13, 2022

(30) Foreign Application Priority Data

May 24, 2019    (KR) .................... 10-2019-0061460
Jun. 18, 2019    (KR) .................... 10-2019-0072419

(51) Int. Cl.
*H01M 4/36*    (2006.01)
*H01M 4/505*    (2010.01)
(Continued)

(52) U.S. Cl.
CPC .......... *H01M 4/366* (2013.01); *H01M 4/505* (2013.01); *H01M 4/525* (2013.01);
(Continued)

(58) Field of Classification Search
CPC ....... H01M 4/366; H01M 4/505; H01M 4/525
See application file for complete search history.

(56) References Cited

U.S. PATENT DOCUMENTS 8,435,671 B2    5/2013    Zaghib et al.
10,622,625 B2    4/2020    Jung et al.
(Continued)

FOREIGN PATENT DOCUMENTS

CN    104882587 A    9/2015
CN    109411805 A    3/2019
(Continued)

OTHER PUBLICATIONS

Korean Notice of Allowance issued Dec. 22, 2022, in corresponding KR Patent Application No. 10-2022-0134809 (3 pages).
(Continued)

*Primary Examiner* — Christopher P Domone
(74) *Attorney, Agent, or Firm* — Womble Bond Dickinson (US) LLP

(57) ABSTRACT

Provided are a cathode for a secondary battery, a manufacturing method therefor, and a lithium secondary battery comprising same, the cathode comprising: a cathode current collector; a first layer which is arranged on at least one surface of the cathode current collector and which comprises a first cathode active material; and a second layer which is arranged on the first layer and which comprises a second cathode active material, wherein the first cathode active material is represented by the following chemical formula 1, the second cathode active material is represented by the following chemical formula 1 or 2, and the first cathode active material and the second cathode active material are different from each other.

(Continued)

$Li_xNi_yM_{1-y}O_2$     <Chemical formula 1>

$Li_\alpha Co_\beta M'1_{-\beta}O_2$     <Chemical formula 2>

See the Detailed Description of the Invention for the definitions of x, y, a, p, M and M' in the formulas.

19 Claims, 10 Drawing Sheets

(51) Int. Cl.
    *H01M 4/525*     (2010.01)
    *H01M 10/0525*    (2010.01)
    *H01M 4/02*      (2006.01)

(52) U.S. Cl.
    CPC .. *H01M 10/0525* (2013.01); *H01M 2004/021* (2013.01); *H01M 2004/028* (2013.01)

(56) References Cited

U.S. PATENT DOCUMENTS

| | | |
|---|---|---|
| 11,038,202 B2 | 6/2021 | Koh et al. |
| 2006/0019153 A1 | 1/2006 | Imachi et al. |
| 2006/0099495 A1 | 5/2006 | Suzuki et al. |
| 2012/0045694 A1 | 2/2012 | Park et al. |
| 2012/0121978 A1 | 5/2012 | Okada et al. |
| 2013/0149604 A1* | 6/2013 | Fujiki ............... H01M 4/667 429/211 |
| 2013/0224584 A1* | 8/2013 | Sung ............... H01M 4/13 429/211 |
| 2014/0363736 A1 | 12/2014 | Kim et al. |
| 2015/0243966 A1* | 8/2015 | Endo ............... H01M 4/131 429/223 |
| 2016/0329597 A1* | 11/2016 | Park ............... H01M 10/0587 |
| 2017/0092943 A1 | 3/2017 | Li et al. |
| 2019/0013545 A1 | 1/2019 | Kim et al. |
| 2020/0058930 A1 | 2/2020 | Otohata et al. |

FOREIGN PATENT DOCUMENTS

| | | |
|---|---|---|
| EP | 3444887 A2 | 2/2019 |
| JP | 2007-250499 A | 9/2007 |
| JP | 2015-179662 A | 10/2015 |
| JP | 5824460 B2 | 11/2015 |
| JP | 2017-63027 A | 3/2017 |
| JP | 2017-191651 A | 10/2017 |
| JP | 2018-63757 A | 4/2018 |
| KR | 10-2006-0052499 A | 5/2006 |
| KR | 10-2006-0053914 A | 5/2006 |
| KR | 10-2008-0091499 A | 10/2008 |
| KR | 10-2012-0017671 A | 2/2012 |
| KR | 10-2012-0124077 A | 11/2012 |
| KR | 10-2014-0070259 A | 6/2014 |
| KR | 10-2014-0140976 A | 12/2014 |
| KR | 10-2015-0043769 A | 4/2015 |
| KR | 10-1558774 B1 | 10/2015 |
| KR | 10-2018-0004679 A | 1/2018 |
| KR | 10-2018-0058197 A | 5/2018 |
| KR | 10-2020-0129580 A | 11/2020 |
| WO | WO 2018/186017 A1 | 10/2018 |

OTHER PUBLICATIONS

Korean Notice of Allowance issued Dec. 27, 2022, in corresponding KR Patent Application No. 10-2022-0153544 (3 pages).

International Search Report of PCT/KR2020/006667, Aug. 24, 2020, 4 pages.

EPO Extended European Search Report dated Feb. 9, 2023, issued in corresponding European Patent Application No. 20814513.6 (8 pages).

Japanese Office Action dated Dec. 23, 2022, issued in corresponding Japanese Patent Application No. 2021-569532 (5 pages).

Chinese Office Action, with English translation, dated Jan. 4, 2024, issued in corresponding Chinese Patent Application No. 202080039233.6 (17 pages).

Korean Office Action dated Oct. 22, 2021, issued in Korean Patent Application No. 10- 2019-0061460 (6 pages).

Korean Office Action dated Dec. 16, 2021, issued in Korean Patent Application No. 10-2019-0072419 (9 pages).

Japan Office Action, Application No. 2023-80948, issued on Jul. 29, 2024, 5 pps.

\* cited by examiner

CATHODE FOR LITHIUM SECONDARY BATTERY, MANUFACTURING METHOD THEREFOR, AND LITHIUM SECONDARY BATTERY COMPRISING SAME

CROSS-REFERENCE TO RELATED APPLICATION(S)

This application is a U.S. National Phase Patent Application of International Application Number PCT/KR2020/006667, filed on May 21, 2020, which claims priority of Korean Patent Application Number 10-2019-0061460, filed on May 24, 2019, and Korean Patent Application Number 10-2019-0072419, filed on Jun. 18, 2019, the entire content of each of which is incorporated herein by reference.

TECHNICAL FIELD

The present disclosure relates to a cathode for lithium secondary batteries, a method of manufacturing the same, and a lithium secondary battery including the same.

BACKGROUND ART

Lithium secondary batteries are used as power sources for driving portable electronic appliances such as video cameras, mobile phones, and notebook computers.

Rechargeable lithium secondary batteries may have three times higher energy density per unit weight than known lead batteries, nickel-cadmium batteries, nickel metal hydride batteries, and nickel-zinc batteries, and may be charged at high speed.

In a lithium secondary battery, electrical energy is produced by an oxidation-reduction reaction occurring when lithium ions are absorbed/desorbed in/from a cathode and an anode in a state in which an organic electrolyte or a polymer electrolyte is charged between the cathode and anode containing an active material capable of absorption and desorption of lithium ions.

In particular, for the realization of high-capacity secondary batteries, research on thick-film electrode plates is being actively conducted. A thick-film electrode plate is advantageous in that it allows a high-capacity battery to be realized by reducing the thickness of a substrate/separator or the like, and the unit cost of a battery is reduced, but is problematic in that performance of a battery is deteriorated due to an increase in movement distance of electrons or lithium ions according to the thickening of an electrode plate.

In particular, the deterioration in performance of such a thick-film electrode plate is remarkable in the non-uniform charge/discharge characteristics in the thickness direction of the electrode plate. Specifically, the increase in film thickness of the electrode plate due to thickening causes an increase in a polarization during charging and discharging. This polarization is caused by a potential difference in the thickness direction of the electrode plate. This polarization causes one part to have a high potential and the other part to have a low potential, thereby causing a difference in charge/discharge depth of an active material during charging and discharging. As a result, as the polarization intensifies, a portion that maintains a high potential is further deteriorated, thereby causing deterioration of overall battery performance.

In order to solve this problem, a method of increasing a conductive material and increasing porosity of an electrode plate has been proposed, but in this case, there is a problem in that there is a limit to high capacity.

Therefore, there is a need for a method of minimizing the deterioration of performance of an electrode while using a thick-film electrode plate.

Meanwhile, as the cathode active material included in the cathode of a lithium secondary battery, a lithium-containing metal oxide is generally used. For example, as the cathode active material of a lithium secondary battery, a transition metal oxide such as lithium cobalt oxide ($LiCoO_2$), lithium manganese oxide ($LiMn_2O_4$) or lithium nickel oxide ($LiNiO_2$), a composite oxide in which some of these transition metals are substituted with other transition metals, or the like is used.

Recently, research has been actively conducted on using an NCM-based cathode active material in which some nickel in lithium nickel oxide is substituted with manganese or cobalt together with $LiCoO_2$ (hereinafter 'LCO'), which has been widely used in the IT field.

When an NCM-based cathode active material is mixed with LCO, there is an advantage in that the battery is increased in capacity and cost is reduced compared to when LCO is used alone. However, an NCM-based cathode active material has a problem in that it is vulnerable to high-voltage stability as compared with LCO. In addition, when the two materials are mixed and used, there is a problem such as an increase in potential of the cathode due to a voltage difference due to a polarization during charging and discharging.

Accordingly, when a mixture of an NCM-based cathode active material and LCO is used, there is a need for a method of improving deterioration and stability in a high-voltage environment.

DESCRIPTION OF EMBODIMENTS

Technical Problem

An aspect of the present disclosure is to provide a novel cathode for secondary batteries, the cathode including a plurality of different cathode active material layers sequentially arranged on a current collector.

Another aspect of the present disclosure is to provide a method of manufacturing the cathode for secondary batteries.

Another aspect of the present disclosure is to provide a lithium secondary battery employing the cathode for secondary batteries.

Solution to Problem

In an aspect of the present disclosure, there is provided a cathode for secondary batteries, the cathode including: a cathode current collector;

a first layer disposed on at least one surface of the cathode current collector and including a first cathode active material; and a second layer disposed on the first layer and including a second cathode active material, wherein the first cathode active material is represented by Formula 1 below, the second cathode active material is represented by Formula 1 or Formula 2 below, and the first cathode active material and the second cathode active material are different from each other:

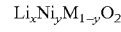  <Formula 1>

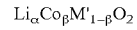  <Formula 2> in the above Formulas, 0.9≤x≤1.2, 0.1≤y≤0.98, 0.9≤α≤1.2, 0≤β≤1.0, and

M and M' are each independently at least one metal or transition metal element having an oxidation number of *2 or *3.

In another aspect of the present disclosure, there is provided a method of manufacturing a cathode for secondary batteries, the method including: applying a first composition including a first cathode active material onto at least one surface of a cathode current collector to form a first layer; and applying a second composition including a second cathode active material onto the first layer to form a second layer, wherein the first cathode active material is represented by Formula 1 below, the second cathode active material is represented by Formula 1 or Formula 2 below, and the first cathode active material and the second cathode active material are different from each other:

$$Li_xNi_yM_yO_2 \quad \text{<Formula 1>}$$

$$Li_\alpha Co_\beta M'_{1-\beta}O_2 \quad \text{<Formula 2>}$$

in the above Formulas, 0.9≤x≤1.2, 0.1≤y≤0.98, 0.9≤α≤1.2, 0≤β≤1.0, and

M and M' are each independently at least one metal or transition metal element having an oxidation number of *2 or *3.

In still another aspect of the present disclosure, there is provided a lithium secondary battery including: the above-described cathode;

an anode disposed to face the cathode; and an electrolyte disposed between the cathode and the anode.

Advantageous Effects of Disclosure

A lithium secondary battery according to an embodiment employs a cathode having a novel layer structure, thereby improving lifespan characteristics.

EXPLANATION OF SYMBOLS FOR MAIN PARTS OF DRAWINGS

Figure 1:
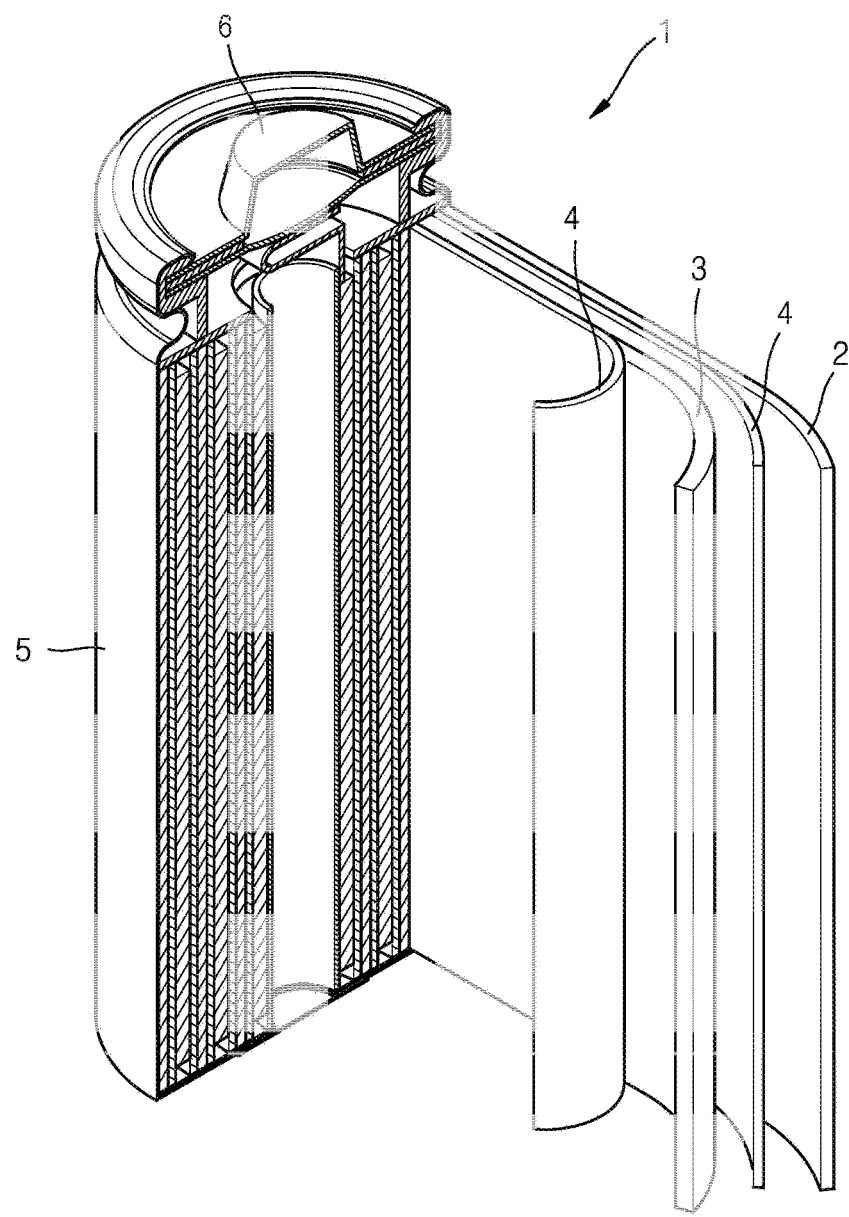
FIG. 1 is a schematic view of a lithium secondary battery according to an embodiment.

1: Lithium secondary battery 2: Anode
3: Cathode 4: Separator
5: Battery case 6: Cap assembly
10, 20: Cathode for secondary batteries 11, 21: Cathode current collector
12, 22: First layer 13, 23: Second layer
24: Third layer

MODE OF DISCLOSURE

Hereinafter, the present disclosure will be described in more detail.

Figure 2:
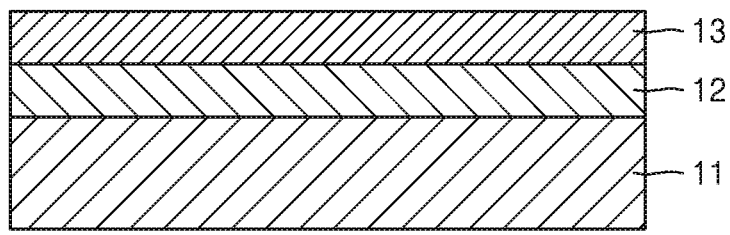
FIG. 2 is a schematic view of a cathode for secondary batteries, according to an embodiment.

Hereinafter, a cathode for secondary batteries according to an embodiment of the present disclosure will be described with reference to FIG. 2. FIG. 2 is a schematic view of a cathode for secondary batteries according to an embodiment. Referring to FIG. 2, a cathode 10 for secondary batteries according to an aspect includes: a cathode current collector 11; a first layer 12 disposed on at least one surface of the cathode current collector 11 and including a first cathode active material; and a second layer 13 disposed on the first layer 12 and including a second cathode active material.

The first cathode active material and the second cathode active material are each independently represented by Formula 1 below, and the first cathode active material and the second cathode active material are different from each other:

$$Li_xNi_yM_{1-y}O_2 \quad \text{<Formula 1>}$$

in the above Formula, 0.9≤x≤1.2, 0.1≤y≤0.98, and

M is at least one metal or transition metal element having an oxidation number of *2 or *3.

As described above, in the cathode 10 for secondary batteries according to the present disclosure, the cathode 10 is made of a Ni-based material, and has a multi-layer structure including a plurality of cathode active materials having different transition metal compositions from each other, it is possible to suppress deterioration of battery performance while realizing high capacity due to thickness increase and to improve lifespan characteristics.

Here, M is an element other than Ni.

In an embodiment, M may be each independently at least one element selected from Al, Mg, Mn, Co, Fe, Cr, V, Ti, Cu, B, Ca, Zn, Zr, Nb, Mo, Sr, Sb, W, and Bi.

In an embodiment, the first cathode active material may be represented by Formula 1A below, and the second cathode active material may be represented by Formula 1B below:

$$Li_{x1}Ni_{y1}M1_{1-y1}O_2 \quad \text{<Formula 1A>}$$

in the above Formula, $$Li_{x2}Ni_{y2}M1_{1-y2}O_2 \quad \text{<Formula 1B>}$$

in the above Formulas, for definitions of M1, x1, y1, M2, x2, and y2, refer to the definitions for M, x, and y in present disclosure, and y1>y2.

That is, in the cathode 10 for secondary batteries according to the present disclosure, in order to solve the deepening of a polarization and the deterioration of lifespan, which are problems of a thick-film electrode as described above, the cathode 10 has a multi-layer structure including a plurality of cathode active materials of different compositions, for example, different transition metal ratios, a lithium transition metal oxide having a high Ni content is provided as a cathode active material in the first layer 12 close to the cathode current collector 11 so as to be advantageous for high capacity, and a lithium transition metal oxide having a low Ni content is provided as a cathode active material in the second layer 13 close to a separator (not shown), so that it is possible to suppress deterioration due to polarization in the thick-filmed anode and improve lifespan.

In contrast, even if the cathode 10 has a multi-layer structure including Ni-based cathode active materials of different compositions, contrary to the above definition, y1<y2 is satisfied. Thus, when a cathode active material having a higher Ni content is included in the second layer 13, deterioration due to polarization cannot be suppressed by an electrode plate structure of the anode, thereby causing a problem in that lifespan is rather deteriorated.

In an embodiment, the first cathode active material and the second cathode active material may be each independently represented by Formula 1-1 or Formula 1-2 below, and the first cathode active material and the second cathode active material may be different from each other:

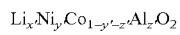  <Formula 1-1>

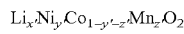  <Formula 1-2> in Formulas 1-1 and 1-2, $0.9 \leq x' \leq 1.2$, $0.1 \leq y' \leq 0.98$, $0 < z' < 0.5$, and $0 < 1-y'-z' < 0.5$.

For example, in Formulas 1-1 and 1-2, y' represents a content of Ni in lithium transition metal oxide, and $0.5 \leq y' \leq 0.98$ may be satisfied. For example, in Formulas 1-1 and 1-2, $0.6 \leq y \leq 0.98$ may be satisfied. For example, in Formulas 1-1 and 1-2, $0.7 \leq y \leq 0.98$ may be satisfied. For example, in Formulas 1-1 and 1-2, $0.8 \leq y \leq 0.98$ may be satisfied.

In an embodiment, the content of Ni in the first cathode active material may be 0.6 mol or more based on the total number of moles of transition metals.

In an embodiment, the content of Ni in the second cathode active material may be 0.6 mol or less based on the total number of moles of transition metals.

As described above, when a lithium transition metal oxide having a high Ni content and a mole fraction of Ni of 0.6 or more among transition metals is used as a cathode active material, despite the advantage of being able to implement a high-capacity battery, there is a disadvantage that lifespan characteristics, high-temperature stability, and high-temperature storage characteristics are severely deteriorated, and available commercialization of high-capacity batteries is difficult. Accordingly, in the lithium secondary battery, as a configuration for solving these disadvantages, such a low Ni content lithium transition metal oxide layer having a Ni mole fraction of 0.6 or less may be formed on a high Ni content lithium transition metal oxide layer, thereby suppressing deterioration due to polarization and improving lifespan characteristics.

For example, the first cathode active material may be $LiNi_{0.6}Co_{0.2}Mn_{0.2}O_2$ or $LiNi_{0.8}Co_{0.1}Mn_{0.12}O_2$.

For example, the first cathode active material may be $LiNi_{0.6}C_{0.2}Mn_{0.2}O_2$ or $LiNi_{0.33}C_{0.33}Mn_{0.33}O_2$.

In an embodiment, the weight ratio of the first cathode active material and the second cathode active material may be 3:7 to 7:3. For example, the weight ratio of the first cathode active material and the second cathode active material may be 3:7 to 5:5. Out of the above range, when the weight ratio of the first cathode active material and the second cathode active material is less than 3:7, the amount of high-content Ni-based material is excessively reduced, so there is a problem in that it is not easy to implement a high battery capacity. In contrast, when the weight ratio of the first cathode active material and the second cathode active material is more than 7:3, there is a problem in that it is not easy to control the deterioration of the cathode.

In an embodiment, the current density ratio of the first layer to the second layer may be 2:8 to 8:2 For example, the current density ratio of the first layer to the second layer may be 3.7 to 7:3.

In an embodiment, the thickness ratio of the first layer to the second layer may be 2:8 to 8:2. In an embodiment, the thickness of the first layer 12 may be 10 μm to 70 μm. In another embodiment, the thickness of the second layer 13 may be 10 μm to 70 μm. Out of the above range, the thickness ratio of the first layer 12 to the second layer 13 is less than 2:8, or the thickness of the first layer 12 is less than 10 μm or the thickness of the second layer 13 is less than 70 μm, so when the second layer 13 is excessively thicker than the first layer 12, there is a problem in that the capacity of a lithium secondary battery relative to volume is too low. In contrast, the thickness ratio of the first layer 12 to the second layer 13 is more than 2:8, or the thickness of the first layer 12 is more than 70 μm or the thickness of the second layer 13 is less than 10 μm, so when the first layer 12 is excessively thicker than the second layer 13, there is an effect of increasing the capacity of a lithium secondary battery. However, side reactions occurring on the surface of the anode cannot be sufficiently prevented, so that deterioration of lifespan characteristics may occur, and in particular, high-temperature characteristics such as high-temperature lifespan characteristics and high-temperature stability may be deteriorated.

For example, the current density of the cathode is 3 to 6 mAh/cm$^2$.

In an embodiment, the thickness of a cathode active material layer including the first layer 11 and the second layer 12 may be 40 μm or more.

For example, the thickness of the cathode active material layer may be 40 μm to 110 μm.

That is, since the cathode 10 according to the present disclosure has a thickness with the above range, a thick-film structure may be implemented, and thus a high-capacity battery may be implemented.

According to another aspect, a cathode 10 for secondary batteries includes: a cathode current collector 11; a first layer 12 disposed on at least one surface of the cathode current collector 11 and including a first cathode active material; and a second layer 13 disposed on the first layer 12 and including a second cathode active material.

The first cathode active material is represented by Formula 1 below, and the second cathode active material is represented by Formula 2:

  <Formula 1>

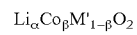  <Formula 2> in the above Formulas, 0.9≤x≤1.2, 0.1≤y≤0.98, 0.9≤α≤1.2, 0≤β≤1.0, and

M and M' are each independently at least one metal or transition metal element having an oxidation number of *2 or *3.

As described above, in the cathode 10 for secondary batteries according to present disclosure, in order to solve the problem of preventing deterioration of a Ni-based material due to a polarization occurring when a LCO-based material and a Ni-based material are simply mixed and applied together, a multi-layer structure including the separate first layer 12 and second layer 13 as described above was introduced.

That is, the cathode 10 for secondary batteries according to present disclosure has a multi-layer structure including a plurality of cathode active materials having different compositions, and simultaneously has a structure in which the first cathode active material represented by Formula 1 is disposed on a layer close to the cathode current collector 11, and the second cathode active material represented by Formula 2 is disposed on a layer close to the anode.

As a result, in the cathode 10 for secondary batteries according to present disclosure, since the second cathode active material, which is an LCO-based material that is relatively close to a high voltage, is located close to the anode, deterioration of the anode due to a polarization may be controlled, and the first cathode active material, which a high-capacity Ni-based material, may be sufficiently applied to exhibit an effect capable of implementing a high capacity. In contrast, even if the LCO-based material and the Ni-based material are included in a multilayer structure as in the present disclosure, when the LCO-based material is located close to the current collector and the Ni-based material is located close to the anode, due to polarization, the Ni-based material is rather put in a high voltage situation, which may cause a problem in that lifespan is further deteriorated.

In an embodiment, M and M' may be each independently at least one element selected from Al, Mg, Mn, Co, Fe, Cr, V, Ti, Cu, B, Ca, Zn, Zr, Nb, Mo, Sr, Sb, W, and Bi.

For example, M may be at least one selected from Al, Mn, and Co. For example, M may be Al and Co, or may be Mn and Co.

In an embodiment, the first cathode active material included in the first layer 12 may be represented by Formula 1-1 or Formula 1-2 below:

$Li_{x'}Ni_{y'}Co_{1-y'-z'}Al_{z'}O_2$          <Formula 1-1>

$Li_{x'}Ni_{y'}Co_{1-y'-z'}Mn_{z'}O_2$          <Formula 1-2> in Formulas 1-1 and 1-2, 0.9≤x'≤1.2, 0.1≤y'≤0.98, 0<z'<0.5, and 0<1−y'−z'<0.5.

For example, in Formulas 1-1 and 1-2, y' represents a content of Ni in lithium transition metal oxide, and 0.5≤y'≤0.98 may be satisfied, for example, 0.5<y'≤0.98 may be satisfied. For example, in Formulas 1-1 and 1-2, 0.6≤y≤0.98 may be satisfied. For example, in Formulas 1-1 and 1-2, 0.7≤y≤0.98 may be satisfied. For example, in Formulas 1-1 and 1-2, 0.8≤y≤0.98 may be satisfied.

As described above, when a lithium transition metal oxide having a high Ni content and a mole fraction of Ni of 0.5 or more among transition metals is used as a cathode active material, despite the advantage of being able to implement a high-capacity battery, there is a disadvantage that lifespan characteristics, high-temperature stability, and high-temperature storage characteristics are severely deteriorated, and available commercialization of high-capacity batteries is difficult. Accordingly, in the lithium secondary battery, as a configuration for solving these disadvantages, the above-described LCO-based material is applied onto the first layer including a Ni-based material, thereby exhibiting excellent lifespan characteristics and high-temperature stability through a mechanism of preventing side reactions occurring on the surface of the cathode.

For example, the cathode for secondary batteries may include at least one lithium transition metal oxide selected from $LiNi_{0.8}Co_{0.15}Mn_{0.05}O_2$, $LiNi_{0.85}Co_{0.1}Mn_{0.05}O_2$, $LiNi_{0.88}Co_{0.08}Mn_{0.04}O_2$, $LiNi_{0.88}Co_{0.08}Al_{0.04}O_2$, $Li_{1.02}Ni_{0.80}Co_{0.15}Mn_{0.05}O_2$, $Li_{1.02}Ni_{0.85}Co_{0.10}Mn_{0.05}O_2$, $Li_{1.02}Ni_{0.88}Co_{0.08}Mn_{0.04}O_2$, $Li_{1.02}Ni_{0.88}Co_{0.08}Al_{0.04}O_2$, $LiNi_{0.8}Co_{0.5}Al_{0.05}O_2$, $LiNi_{0.88}Co_{0.1}Al_{0.02}O_2$, $LiNi_{0.88}Co_{0.12}Mn_{0.04}O_2$, $LiNi_{0.85}Co_{0.1}Al_{0.05}O_2$, and $LiNi_{0.88}Co_{0.1}Mn_{0.02}O_2$ as the cathode active material.

For example, in Formula 2, 0<β≤1.0 may be satisfied.

In an embodiment, the second cathode active material included in the second layer 13 may be $LiCoO_2$.

In an embodiment, the weight ratio of the first cathode active material and the second cathode active material may be 3:7 to 7:3. For example, the weight ratio of the first cathode active material and the second cathode active material may be 3:7 to 5:5. Out of the above range, when the weight ratio of the first cathode active material and the second cathode active material is less than 3:7, the content of a Ni-based material is excessively reduced, so there is a problem in that it is not easy to implement a high battery capacity. In contrast, when the weight ratio of the first cathode active material and the second cathode active material is more than 7:3, there is a problem in that it is not easy to control the deterioration of the cathode.

In an embodiment, the thickness ratio of the first layer to the second layer may be 3:7 to 7:3. In an embodiment, the thickness of the first layer 12 may be 3 μm to 50 μm. In another embodiment, the thickness of the second layer 13 may be 3 μm to 50 μm. Out of the above range, the thickness ratio of the first layer 12 to the second layer 13 is less than 3:7, or the thickness of the first layer 12 is less than 3 μm or the thickness of the second layer 13 is less than 50 μm, so when the second layer 13 is excessively thicker than the first layer 12, there is a problem in that the capacity of a lithium secondary battery relative to volume is too low. In contrast, the thickness ratio of the first layer to the second layer is more than 7:3, or the thickness of the first layer 12 is more than 50 μm or the thickness of the second layer 13 is less than 3 μm, so when the first layer 12 is excessively thicker than the second layer 13, there is an effect of increasing the capacity of a lithium secondary battery. However, side reactions occurring on the surface of the anode cannot be sufficiently prevented, so that deterioration of lifespan characteristics may occur, and in particular, high-temperature characteristics such as high-temperature lifespan characteristics and high-temperature stability may be deteriorated.

For example, the current density of the cathode is 2 to 10 mAh/cm$^2$.

In an embodiment, the active material loading ratio of the first layer 12 to the second layer 13 is 3:7 to 7:3. In an embodiment, the active material loading of the first layer 12 may be 3 to 40 mg/cm$^2$. In another embodiment, the active material loading of the second layer 13 may be 40 to 3 mg/cm$^2$.

In an embodiment, the cathode for secondary batteries may further include at least one of a binder and a conductive material. For descriptions of the binder and the conductive material, refer to those to be described later.

In an embodiment, the sum of the content of the first cathode active material and the content of the second cathode active material is 80 to 98 wt % based on the total weight of the cathode.

Figure 3:
FIG. 3 is a schematic view of a cathode for secondary batteries, according to another embodiment.

FIG. 3 is a schematic view of a cathode for secondary batteries according to another embodiment. Referring to FIG. 3, a cathode 20 for secondary batteries includes: a cathode current collector 21; a first layer 22 disposed on at least one surface of the cathode current collector 21 and including a first cathode active material; and a second layer 23 disposed on the first layer 22 and including a second cathode active material, and further includes: a third layer 24 disposed on the second layer 23 and including a third cathode active material, wherein the third cathode active material is represented by Formula 1 below, and has a different composition from the first cathode active material and the second cathode active material:

$$Li_xNi_yM_{1-y}O_2 \qquad \text{<Formula 1>}$$

in the above Formula, $0.9 \leq x \leq 1.2$, $0.1 \leq y \leq 0.98$, and

M is at least one metal or transition metal element having an oxidation number of *2 or *3.

That is, the cathode 20 for secondary batteries according to the present disclosure may include a separate cathode active material layer as the third layer 24 in addition to the above-described first layer 22 and second layer 23. Although not separately described, the cathode 20 may further include additional layers including lithium transition metal oxides having different compositions, and in this case, the number of additional layers is not particularly limited.

For example, the first cathode active material is represented by Formula 1A below, the second cathode active material is represented by Formula 1B below, and the third cathode active material is represented by Formula 1C:

$$Li_{x1}Ni_{y1}M1_{1-y1}O_2 \qquad \text{<Formula 1A>}$$

in the above Formula, $$Li_{x2}Ni_{y2}M2_{1-y2}O_2 \qquad \text{<Formula 1B>}$$

$$Li_{x3}Ni_{y3}M3_{1-y3}O_2 \qquad \text{<Formula 1C>}$$

in the above Formulas, for definitions of M1, x1, y1, M2, x2, y2, M3, x3, and y3, refer to the definitions for M, x, and y in claim 1, and y1>y2>y3.

That is, when the cathode 20 includes more than two cathode active material layers, these cathode active material layers may be arranged in a direction in which the content of Ni decreases from the layer 22 close to the cathode current collector 21 toward the layer 24 far from the cathode current collector 21. Through this, it is possible to exhibit high-capacity characteristics and suppression of battery performance deterioration to be implemented in the present disclosure.

For example, the current density of the third layer may be less than or equal to the current density of the second layer, and the current density of the second layer may be less than or equal to the current density of the first layer.

Figure 4:
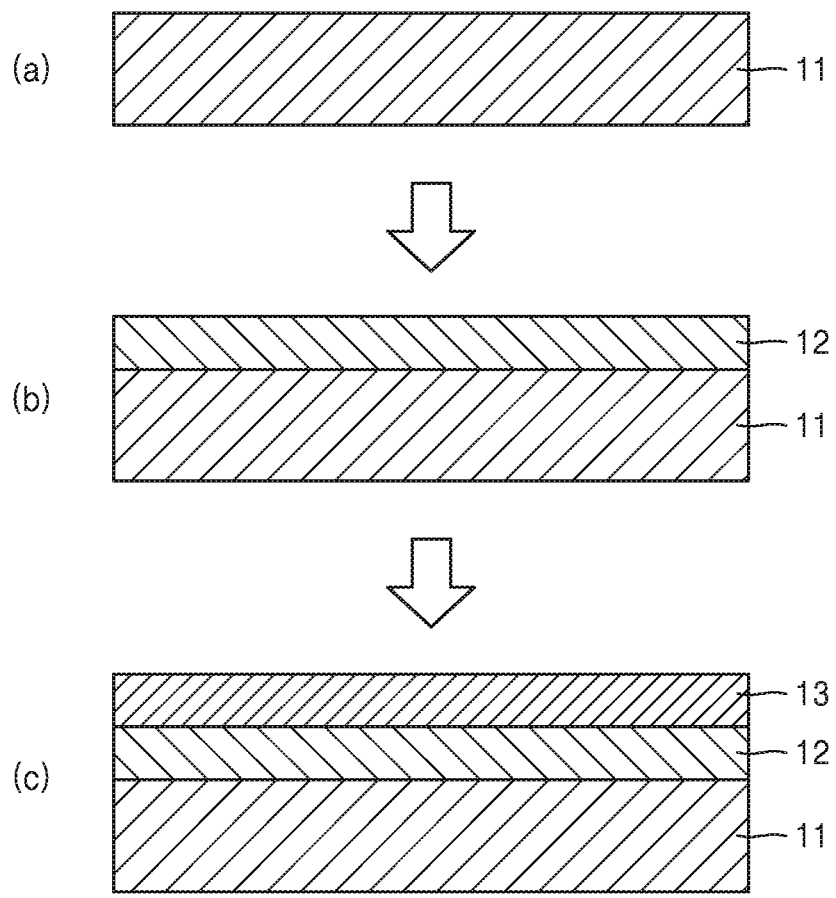
FIG. 4 is a schematic view illustrating a method of manufacturing a cathode for secondary batteries, according to an embodiment.

Hereinafter, a method of manufacturing a cathode for secondary batteries according to an embodiment of the present disclosure will be described with reference to FIG. 4. FIG. 4 is a schematic view illustrating a method of manufacturing a cathode for secondary batteries according to an embodiment. Referring to FIG. 4, a method of manufacturing a cathode for secondary batteries according to another aspect of the present disclosure includes: applying a first composition including a first cathode active material onto at least one surface of a cathode current collector 11 to form a first layer 12; and applying a second composition including a second cathode active material onto the first layer 12 to form a second layer 13, wherein the first cathode active material is represented by Formula 1 below, the second cathode active material is represented by Formula 1 or Formula 2 below, and the first cathode active material and the second cathode active material are different from each other:

$$Li_xNi_yM_{1-y}O_2 \qquad \text{<Formula 1>}$$

$$Li_\alpha Co_\beta M'_{1-\beta}O_2 \qquad \text{<Formula 2>}$$

in the above Formulas, $0.9 \leq x \leq 1.2$, $0.1 \leq y \leq 0.98$, $0.9 \leq \alpha \leq 1.2$, $0 \leq \beta \leq 1.0$, and M and M' are each independently at least one metal or transition metal element having an oxidation number of *2 or *3.

In Formulas 1 and 2, for detailed descriptions of x, y, α, β, M and M', refer to the aforementioned descriptions.

Further, although not separately described, when a third layer including a third cathode active material is further formed, a process similar to the process of forming the second layer 12 on the first layer 11 may be used.

In one specific example, the first composition or the second composition may further include a binder and a conductive material.

The binder, which is a component that assists in bonding between a lithium transition metal oxide, that is, a cathode active material or an inorganic material and a conductive material and in bonding to a current collector, may be included between the cathode current collector and the cathode active material layer, in the cathode active material layer, between the cathode active material layer and the inorganic layer, or in the inorganic layer, and may be added in an amount of 1 to 50 parts by weight based on 100 parts by weight of the cathode active material or the inorganic material. For example, the binder may be added in an amount of 1 to 30 parts by weight, 1 to 20 parts by weight, or 1 to 15 parts by weight, based on 100 parts by weight of the cathode active material or the inorganic material. For example, the binder may be at least one selected from polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethersulfone, polyamide, polyacetal, polyphenylene oxide, polybutylene terephthalate, ethylene-propylene-diene ether polymer (EPDM), sulfonated EPDM, styrene butadiene rubber (SBR), and fluorine rubber. For example, when there are two or more binders of the above-described examples, various copolymers in which the two or more binders are polymerized may be used.

The first composition or the second composition may optionally further include a conductive material in order to further improve electrical conductivity by providing a conductive path to the above-described positive active material or inorganic material. As the conductive material, any material generally used in lithium secondary batteries may be used, and examples thereof may include carbon-based materials such as carbon black, acetylene black, ketjen black, and carbon fibers (for example, vapor-grown carbon fibers); metal-based materials such as metal powders of copper, nickel, aluminum, or silver and metal fibers; conductive polymers such as polyphenylene derivatives; and mixtures thereof. The content of the conductive material may be appropriately adjusted and used. For example, the weight ratio of the cathode active material or inorganic material and the conductive material may be in a range of 99:1 to 90:10.

The cathode current collector has a thickness of 3 μm to 500 μm, and is not particularly limited as long as it has high conductivity without causing chemical change in the battery. For example, as the cathode current collector, stainless steel, aluminum, nickel, titanium, calcined carbon, or aluminum or stainless steel surface-treated with carbon, nickel, titanium or silver may be used. The cathode current collector may increase the adhesion of the cathode active material by forming fine irregularities on the surface thereof, and may be made into various forms such as a film, a sheet, a foil, a net, a porous body, a foam body, and a nonwoven fabric.

A positive electrode plate may be manufactured by directly applying and drying the prepared first composition on a cathode current collector. Alternatively, a positive electrode plate may be manufactured by casting the first composition on a separate support and peeling the cast composition from the support to obtain films and then laminating the films on the cathode current collector.

Meanwhile, the first composition or the second composition may further include a solvent.

As the solvent, N-methylpyrrolidone, acetone, or water may be used, but the solvent is not limited thereto and any solvent that can be used in the art may be used.

In one specific example, the content of the first cathode active material may be 80 to 98 wt % based on the total weight of the first composition. For example, the content of the first cathode active material may be 85 to 98 wt % based on the total weight of the first composition, but is not limited thereto.

In one specific example, the content of the second cathode active material may be 80 to 98 wt % based on the total weight of the second composition. For example, the content of the second cathode active material may be 85 to 98 wt % based on the total weight of the second composition, but is not limited thereto.

For example, in the process of applying and then drying the first composition or the second composition, the drying may be performed by primary drying for about 5 minutes to 30 minutes in a temperature range of 80 to 130° C.

In another aspect of the present disclosure, a lithium secondary battery includes: the above-described cathode for secondary batteries; an anode disposed to face the cathode; and an electrolyte disposed between the cathode and the anode.

In one specific example, the operating voltage of the lithium secondary battery may be 2.5 to 4.5 V. For example, the operating voltage of the lithium secondary battery may be 3.0 to 4.4 V.

The cathode for secondary batteries essentially includes the above-described cathode current collector, first layer, and second layer, and descriptions thereof are referred to as described above. Furthermore, each of the first layer and the second layer has the above-described first cathode active material and second cathode active material as essential components, and may further include a cathode active material commonly used in lithium secondary batteries in addition to these essential components.

For example, each of the first layer and the second layer may further include a compound represented by any one of Formulae of $Li_aA'_{1-b}B_bD_2$ (where, $0.90 \leq a \leq 1$, and $0 \leq b \leq 0.5$ are satisfied); $Li_aE_{1-b}B_bO_{2-c}D_c$ (where, $0.90 \leq a \leq 1$, $0 \leq b \leq 0.5$, and $0 \leq c \leq 0.05$ are satisfied); $LiE_{2-b}B_bO_{4-c}D_c$ (where, $0 \leq b \leq 0.5$ and $0 \leq c \leq 0.05$ are satisfied); $Li_aNi_{1-b-c}Co_bB_cD_\alpha$ (where, $0.90 \leq a \leq 1$, $0 \leq b \leq 0.5$, $0 \leq c \leq 0.05$, and $0 < \alpha \leq 2$ are satisfied); $Li_aNi_{1-b-c}Co_bB_cO_{2-\alpha}F_\alpha$ (where, $0.90 \leq a \leq 1$, $0 \leq b \leq 0.5$, $0 \leq c \leq 0.05$, and $0 < \alpha < 2$ are satisfied); $Li_aNi_{1-b-c}Co_bB_cO_{2-\alpha}F_2$ (where, $0.90 \leq a \leq 1$, $0 \leq b \leq 0.5$, $0 \leq c \leq 0.05$, and $0 < \alpha < 2$ are satisfied); $Li_aNi_{1-b-c}Mn_bB_cD_\alpha$ (where, $0.90 \leq a \leq 1$, $0 \leq b \leq 0.5$, $0 \leq c \leq 0.05$, and $0 < \alpha \leq 2$ are satisfied); $Li_aNi_{1-b-c}Mn_bB_cO_{2-\alpha}F_\alpha$ (where, $0.90 \leq a \leq 1$, $0 \leq b \leq 0.5$, $0 \leq c \leq 0.05$, and $0 < \alpha < 2$ are satisfied): $Li_aNi_{1-b-c}Mn_bB_cO_{2-\alpha}F_2$ (where, $0.90 \leq a \leq 1$, $0 \leq b \leq 0.5$, $0 \leq c \leq 0.05$, and $0 < \alpha < 2$ are satisfied); $Li_aNi_bE_cG_dO_2$ (where, $0.90 \leq a \leq 1$, $0 \leq b \leq 0.9$, $0 \leq c \leq 0.5$, and $0.001 \leq d \leq 0.1$ satisfied); $Li_aNi_bCo_cMn_dGeO_2$ (where, $0.90 \leq a \leq 1$, $0 \leq b \leq 0.9$, $0 \leq c \leq 0.5$, $0 \leq d \leq 0.5$, and $0.001 \leq e \leq 0.1$ are satisfied); $Li_aNiG_bO_2$ (where, $0.90 \leq a \leq 1$ and $0.001 \leq b \leq 0.1$ are satisfied); $Li_aCoG_bO_2$ (where, $0.90 \leq a \leq 1$ and $0.001 \leq b \leq 0.1$ are satisfied); $Li_aMnG_bO_2$ (where, $0.90 \leq a \leq 1$ and $0.001 \leq b \leq 0.1$ are satisfied); $Li_aMn_2G_bO_4$ (where, $0.90 \leq a \leq 1$ and $0.001 \leq b \leq 0.1$ are satisfied); $QO_2$; $QS_2$; $LiQS_2$; $V_2O_5$; $LiV_2O_5LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In Formulae above, A' is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof. For example, the compound is $LiCoO_2$, $LiMn_{x''}O_{2x''}$ (x''=1, 2), $LiNi_{1-x''}Mn_{x''}O_{2x''}$ ($0<x''<1$), $LiNi_{1-x'''-y'}Co_{x''}Mn_{y''}O_2$ ($0 \leq x'' \leq 0.5$, $0 \leq y'' \leq 0.5$), or $FePO_4$.

Meanwhile, the anode may be manufactured by the following method.

For example, an anode active material, a conductive material, a binder, and a solvent are mixed to prepare an anode active material composition. A negative electrode plate may be manufactured by directly applying and drying the anode active material composition on a metal current collector. Alternatively, a negative electrode plate may be manufactured by casting the anode active material composition on a separate support and peeling the cast composition from the support to obtain films and then laminating the films on the metal current collector.

As the anode active material, any material may be used as long as it can be used as an anode active material for lithium batteries in the art. For example, the anode active material may include at least one selected from a lithium metal, a metal alloyable with lithium, a transition metal oxide, a non-transition metal oxide, and a carbon-based material.

For example, the metal alloyable with lithium may be Si, Sn, Al, Ge, Pb, Bi, Sb, Si—Y alloy (wherein Y is an alkali metal, alkaline earth metal, group 13 element, group 14 element, transition metal, rare earth element, or a combination thereof, but not Si), Sn—Y alloy (wherein Y is an alkali metal, alkaline earth metal, a group 13 element, a group 14 element, a transition metal, a rare earth element, or a combination thereof, but not Sn), or the like. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te. For example, the transition metal oxide may be lithium titanium oxide, vanadium oxide, lithium vanadium oxide, or the like. For example, the non-transition metal oxide may be $SnO_2$, $SiO_{x'''}$ ($0<x'''<2$), or the like.

The carbon-based material may be crystalline carbon, amorphous carbon, or a mixture thereof. The crystalline carbon may be amorphous, plate-like, flake-like, spherical or fibrous natural or artificial graphite, and the amorphous carbon may be soft carbon (low temperature calcined carbon) or hard carbon, mesophase pitch carbide, calcined coke, or the like.

In the anode active material composition, the conductive material, the binder, and the solvent may be the same as those of the cathode active material composition (that is, the first composition).

The contents of the anode active material, the conductive material, the binder, and the solvent are levels commonly used in lithium batteries. At least one of the conductive material, the binder, and the solvent may be omitted depending on the use and configuration of the lithium battery.

Next, a separator to be inserted between the cathode and the anode is prepared.

As the separator, any separator may be used as long as it is commonly used in lithium batteries. A separator having low resistance to ion movement of an electrolyte and having an excellent electrolyte-retaining ability may be used. For example, the separator may be a non-woven fabric or woven fabric made of any one selected from glass fiber, polyester, Teflon, polyethylene, polypropylene, polytetrafluoroethylene (PTFE), or a combination thereof. For example, a windable separator made of polyethylene, polypropylene or the like may be used in lithium-ion batteries, and a separator having an excellent organic electrolyte-retaining ability may be used in lithium-ion polymer batteries. For example, the separator may be manufactured according to the following method.

A polymer resin, a filler, and a solvent are mixed to prepare a separator composition. A separator may be formed by directly applying the separator composition onto an electrode and drying the composition. Alternatively, a separator may be formed by casting the separator composition on a support and drying the composition, peeling the cast composition from the support to obtain films and then laminating the films on an electrode.

The polymer resin used for manufacturing the separator is not particularly limited, and all materials used for a bonding material of an electrode plate may be used. For example, as the polymer resin, a vinylidene fluoride/hexafluoropropylene copolymer, polyvinylidene fluoride (PVDF), polyacrylonitrile, polymethyl methacrylate, or a mixture thereof may be used.

Next, an electrolyte is prepared.

For example, the electrolyte may be an organic electrolyte. Further, the electrolyte may be a solid electrolyte. For example, the solid electrolyte may be boron oxide or lithium oxynitride, but is not limited thereto, and any solid electrolyte may be used as long as it is used as a solid electrolyte in the art. The solid electrolyte may be formed on the anode by a method such as sputtering.

For example, the organic electrolyte may be prepared by dissolving a lithium salt in an organic solvent.

As the organic solvent, any material may be used as long as it is used as an organic solvent in the art. For example, the organic solvent is propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, Tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, or a mixture thereof.

As the lithium salt, any material may be used as long as it is used as a lithium salt in the art. For example, the lithium salt is $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_{x''''}F_{2x''''+1}SO_2)(C_{y''''}F_{2y''''+1}SO_2)$ (here, x'''' and y'''' are each a natural number), LiCl, LiI, or a mixture thereof.

As shown in FIG. 1, the lithium secondary battery 1 includes a cathode 3, an anode 2, and a separator 4. The anode 3, the cathode 2, and the separator 4 are wound or folded and accommodated in a battery case 5. Then, an organic electrolyte is injected into the battery case 5, and the battery case 5 is sealed with a cap assembly 6 to complete the lithium secondary battery 1. The battery case 5 may have a cylindrical shape, a rectangular shape, or a thin film shape. For example, the lithium secondary battery 1 may be a thin-film battery. The lithium secondary battery 1 may be a lithium-ion battery.

The separator may be located between the anode and the cathode to form a battery structure. The battery structure is laminated as a bi-cell structure and then impregnated with an organic electrolyte, and the resulting product is accommodated in a pouch and sealed to complete a lithium-ion polymer battery.

The lithium secondary battery may be used not only in a battery used as a power source for a small device, but also as a unit battery of a medium/large device battery module including a plurality of batteries.

Examples of the medium/large device may include, but are not limited to, xEVs including power tool, electric vehicle (EV), hybrid electric vehicle (HEV) and plug-in hybrid electric vehicle (PHEV); electric two-wheeled vehicles including E-bike and E-scooter; electric golf carts; electric trucks: electric commercial vehicles; and power storage systems. The lithium secondary battery may be used in all other applications requiring high output, high voltage and high temperature driving.

Hereinafter, embodiments will be described in more detail with reference to Examples and Comparative Examples. However, these Examples are for illustrating technical ideas, and the scope of the present disclosure is not limited thereto.

(Manufacture of Lithium Secondary Battery)

Example 1

(Manufacture of Cathode)

96 wt % of $LiNi_{0.8}Mn_{0.1}Co_{0.1}O_2$ as a first cathode active material, 2 wt % of super-p as a conductive material, and 2 wt % of polyvinylidene fluoride as a binder were mixed to prepare a first composition. The first composition was applied onto an aluminum (Al) thin film having a thickness of about 20 μm, which is a cathode current collector, dried at about 80° C. for 20 minutes, and then roll-pressed to obtain a cathode coated with a first layer.

A second composition, in which 96 wt % of $LiNi_{0.6}Mn_{0.2}Co_{0.2}O_2$ as a second cathode active material, 2 wt % of super-p as a conductive material, and 2 wt % of polyvinylidene fluoride as a binder were mixed, was applied onto the first layer to form a second layer. Then, the second layer was dried at about 80° C. for 20 minutes to prepare a double-coated cathode.

A third composition, in which 96 wt % of $LiNi_{0.33}Mn_{0.33}Co_{0.33}O_2$ as a third cathode active material, 2 wt % of super-p as a conductive material, and 2 wt % of polyvinylidene fluoride as a binder were mixed, was applied onto the second layer to form a third layer. Then, the third layer was dried at about 80° C. for 20 minutes to prepare a triple-coated cathode.

In this case, the current density of the first layer was about 2.24 mAh/cm², the current density of the second layer was about 1.68 mAh/cm², the current density of the third layer was about 1.68 mAh/cm², and the current density ratio of the first layer, the second layer, and the third layer was about 4:3:3. Meanwhile, the content ratio of the first cathode active material, second cathode active material and third cathode active material in the cathode was 3.6:3:3.4.

In this case, the capacity ratio of the first layer, the second layer and the third layer was 4:3:3, the thickness of the cathode active material layer including the first to third layers was about 80 μm, and the total current density thereof was about 5.6 mAh/cm².

In this case, the loading level of the cathode was 28 mg/cm².

Figure 5:
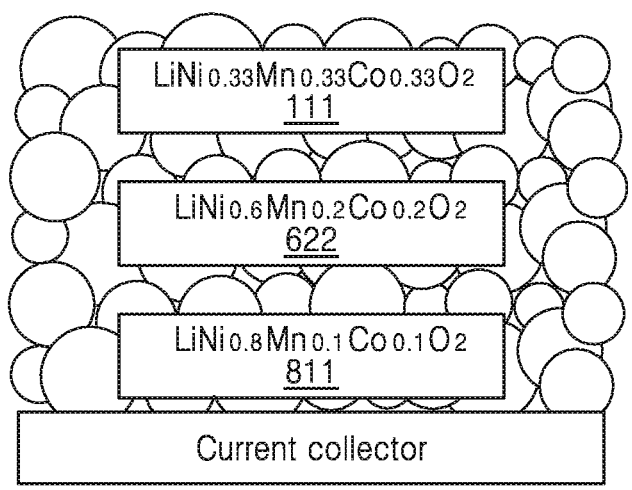
FIG. 5 is a schematic view of the cathode prepared in Example 1.

FIG. 5 is a schematic view of a structure of the cathode.
(Preparation of Electrolyte)

7 wt % of fluoroethylene carbonate (FEC) was added to a mixed solvent of ethylene carbonate (EC), propylene carbonate (PC), ethyl propionate (EP) and propylene propionate (PP) at a volume ratio of 2:1.2:5, including 1.15M $LiPF_6$ as a lithium salt, to prepare an electrolyte for lithium secondary batteries.
(Assembly of Lithium Secondary Battery)

A half-cell type lithium secondary battery was manufactured using the cathode, a lithium metal anode, a ceramic-coated polyethylene separator having a thickness of 18 μm, and the electrolyte. In this case, the operating voltage of the lithium secondary battery was 3.0 V to 4.35 V.

Example 2

A lithium secondary battery was manufactured in the same manner as in Example 1, except that the current density of the first layer was about 1.2 mAh/cm², the current density of the second layer was about 0.9 mAh/cm², the current density of the third layer was about 0.9 mAh/cm², and the current density ratio of the first layer, the second layer, and the third layer was adjusted to about 4:3:3.

In this case, the content ratio of the first cathode active material, second cathode active material and third cathode active material in the cathode was 3.6:3.0:3.4.

Further, the capacity ratio of the first layer, the second layer and the third layer was 4:3:3, the thickness of the cathode active material layer including the first to third layers was about 45 μm, and the total current density thereof was about 3 mAh/cm².

In this case, the loading level of the cathode was 15 mg/cm².

Example 3

A lithium secondary battery was manufactured in the same manner as in Example 1, except that a cathode manufactured by the following method was used.
(Manufacture of Cathode)

96 wt % of $LiNi_{0.8}Mn_{0.1}Co_{0.1}O_2$ as a first cathode active material, 2 wt % of super-p as a conductive material, and 2 wt % of polyvinylidene fluoride as a binder were mixed to prepare a first composition. The first composition was applied onto an aluminum (Al) thin film having a thickness of about 20 Lm, which is a cathode current collector, dried at about 80° C. for 20 minutes, and then roll-pressed to obtain a cathode coated with a first layer.

A second composition, in which 96 wt % of $LiNi_{0.33}Mn_{0.33}Co_{0.33}O_2$ as a second cathode active material, 2 wt % of super-p as a conductive material, and 2 wt % of polyvinylidene fluoride as a binder were mixed, was applied onto the first layer to form a second layer. Then, the second layer was dried at about 80° C. for 20 minutes to prepare a double-coated cathode.

In this case, the current density of the first layer was about 3.08 mAh/cm², the current density of the second layer was about 2.52 mAh/cm², and the current density ratio of the first layer and the second layer was about 11:9. Meanwhile, the content ratio of the first cathode active material and second cathode active material in the cathode was 4.9:5.1.

In this case, the capacity ratio of the first layer and the second layer was 11:9, the thickness of the cathode active material layer including the first layer and the second layer was about 80 μm, and the total current density thereof was about 5.6 mAh/cm².

In this case, the loading level of the cathode was 28 mg/cm².

Comparative Example 1

A lithium secondary battery was manufactured in the same manner as in Example 1, except that a cathode manufactured by the following method was used.
(Manufacture of Cathode)

96 wt % of $LiNi_{0.6}Mn_{0.2}Co_{0.2}O_2$ as a cathode active material, 2 wt % of super-p as a conductive material, and 2 wt % of polyvinylidene fluoride as a binder were mixed to prepare a cathode composition. The cathode composition was applied onto an aluminum (Al) thin film having a thickness of about 20 μm, which is a cathode current collector, dried at about 80° C. for 20 minutes, and then roll-pressed to obtain a cathode. In this case, the thickness of a cathode active material layer in the cathode was about 80 μm, the current density of the cathode was 5.6 mAh/cm², and the loading level of the cathode was 28 mg/cm².

Figure 6:
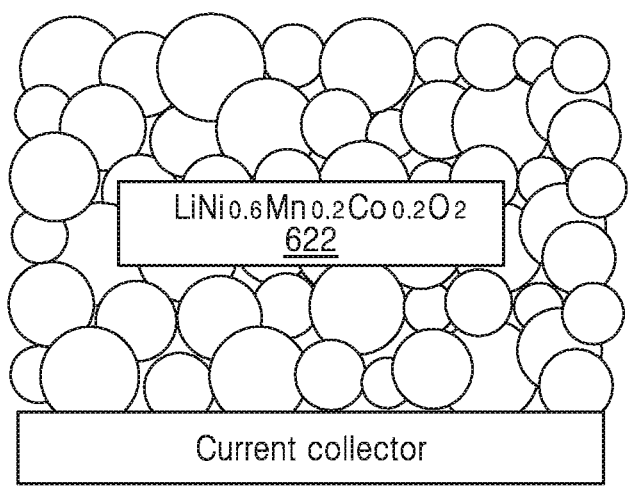
FIG. 6 is a schematic view of the cathode prepared in Comparative Example 1.

FIG. 6 is a schematic view of a structure of the cathode.

Comparative Example 2

A lithium secondary battery was manufactured in the same manner as in Example 1, except that a cathode manufactured by the following method was used.
(Manufacture of Cathode)

96 wt % of $LiNi_{0.6}Mn_{0.2}Co_{0.2}O_2$ as a cathode active material, 2 wt % of super-p as a conductive material, and 2 wt % of polyvinylidene fluoride as a binder were mixed to prepare a cathode composition. The cathode composition was applied onto an aluminum (Al) thin film having a thickness of about 20 μm, which is a cathode current collector, dried at about 80° C. for 20 minutes, and then roll-pressed to obtain a cathode. In this case, the thickness of a cathode active material layer in the cathode was about 43 μm, the current density of the cathode was 3 mAh/cm², and the loading level of the cathode was 15 mg/cm².

Comparative Example 2

A lithium secondary battery was manufactured in the same manner as in Example 1, except that a cathode manufactured by the following method was used.

(Manufacture of Cathode)

96 wt % of $LiNi_{0.33}Mn_{0.33}Co_{0.33}O_2$ as a first cathode active material, 2 wt % of super-p as a conductive material, and 2 wt % of polyvinylidene fluoride as a binder were mixed to prepare a first composition. The first composition was applied onto an aluminum (Al) thin film having a thickness of about 20 μm, which is a cathode current collector, dried at about 80° C. for 20 minutes, and then roll-pressed to obtain a cathode coated with a first layer.

A second composition, in which 96 wt % of $LiNi_{0.6}Mn_{0.2}Co_{0.2}O_2$ as a second cathode active material, 2 wt % of super-p as a conductive material, and 2 wt % of polyvinylidene fluoride as a binder were mixed, was applied onto the first layer to form a second layer. Then, the second layer was dried at about 80° C. for 20 minutes to prepare a double-coated cathode.

A third composition, in which 96 wt % of $LiNi_{0.8}Mn_{0.1}Co_{0.1}O_2$ as a third cathode active material, 2 wt % of super-p as a conductive material, and 2 wt % of polyvinylidene fluoride as a binder were mixed, was applied onto the second layer to form a third layer. Then, the third layer was dried at about 80° C. for 20 minutes to prepare a triple-coated cathode.

In this case, the current density of the first layer was about 1.68 mAh/cm², the current density of the second layer was about 1.68 mAh/cm², the current density of the third layer was about 2.24 mAh/cm², and the current density ratio of the first layer, the second layer, and the third layer was about 3:3:4. Meanwhile, the content ratio of the first cathode active material, second cathode active material and third cathode active material in the cathode was 3.4:3:0.3.6.

In this case, the capacity ratio of the first layer, the second layer and the third layer was 3:3:4, the thickness of the cathode active material layer including the first to third layers was about 80 μm, and the total current density thereof was about 5.6 mAh/cm².

In this case, the loading level of the cathode was 28 mg/cm².

Evaluation Example 1: Evaluation of Initial Charging Profile Characteristics

The lithium secondary batteries manufactured in Example 1 and Comparative Example 1 were charged with a constant current of 0.2 C within a voltage range of 2.8 to 4.3V during one cycle to evaluate the charging profile characteristics indicating a capacity change according to a voltage change.

Figure 7:
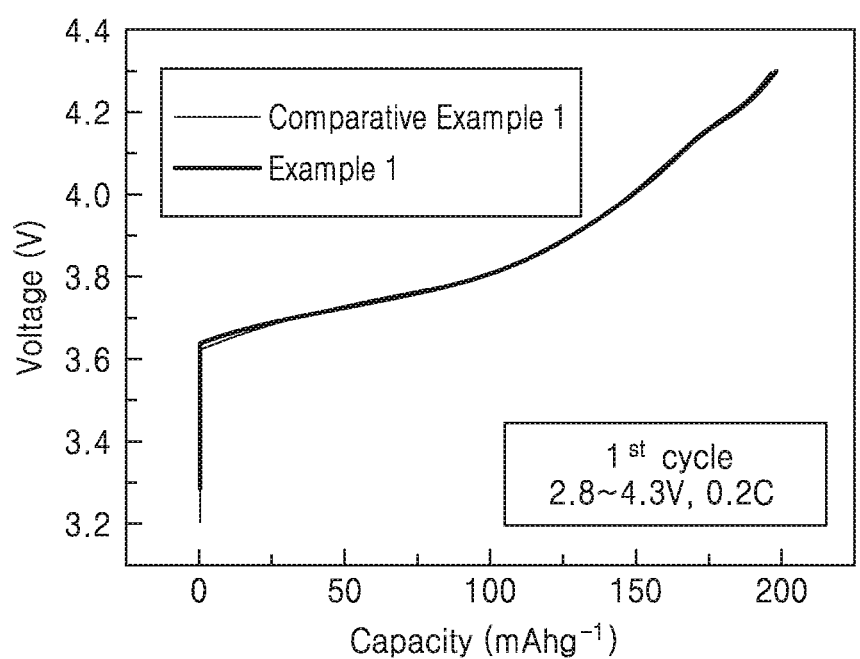
FIG. 7 is a graph illustrating the results of an initial charge profile of a lithium secondary battery to which the cathodes manufactured in Example 1 and Comparative Example 1 are applied.

Evaluation results are shown in FIG. 7. Referring to FIG. 7, although the lithium secondary battery according to Example 1, unlike the lithium secondary battery according to Comparative Example 1, includes lithium transition metal oxide layers of various compositions, the content of Ni metal may be adjusted to a level of the content of Ni metal in the lithium secondary battery according to Comparative Example 1 by appropriately adjusting the ratio of the respective layers.

Thus, it may be confirmed that a high-capacity battery similar to the level of the lithium secondary battery according to Comparative Example 1 is realized.

Evaluation Example 2: Evaluation of Lifespan Characteristics

The lithium secondary batteries manufactured in Example 1 and Comparative Example 1 were charged under charging conductions (constant current/constant voltage of 0.7 C/4.35V, cutoff current of 0.025 C, rest for 10 minutes) and was discharged under discharging conditions (constant voltage of 1.0 C, cutoff voltage of 3.0V, rest for 10 minutes), and capacities thereof during 40 cycles were measured. The measurement results are shown in FIG. 8.

Figure 8:
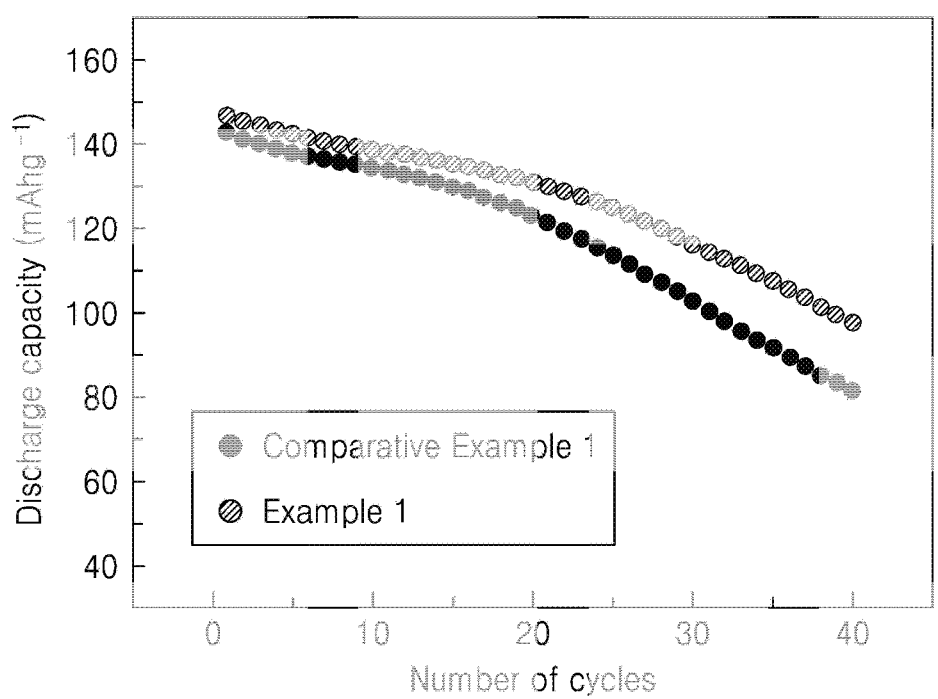
FIG. 8 is a graph illustrating the cycle lifespan of a lithium secondary battery to which the cathodes manufactured in Example 1 and Comparative Example 1 are applied.

Referring to FIG. 8, it may be confirmed that the lithium secondary battery according to Example 1 better maintains capacity characteristics as the number of cycles increases, compared to the lithium secondary battery according to Comparative Example 1. That is, it may be confirmed that even when thick-films cathodes having the same loading level are introduced, the lithium secondary battery according to Example 1 in which the cathode active material layer having a multi-layer structure is introduced may exhibit excellent lifespan characteristics, compared to the lithium secondary battery according to Comparative Example 1 having a single-layer structure, Meanwhile, the capacity retention rates (lifespan) of Examples 2 to 3 and Comparative Examples 2 to 3 as well as Example 1 and Comparative Example 1 after 40 cycles were measured under the same conditions, and the measurement results are shown in Table 1 below.

TABLE 1

|  | Composition | Type of electrode plate | Loading level (mg/cm²) | Lifespan (@ 40cyc) |
|---|---|---|---|---|
| Comparative Example 1 | NCM622 | Single layer | 28 | 55% |
| Comparative Example 2 | NCM622 | Single layer | 15 | 80% |
| Example 1 | NCM111/622/811 | Multi-layer | 28 | 69% |
| Example 2 | NCM111/622/811 | Multi-layer | 15 | 82% |
| Comparative Example 3 | NCM811/622/111 | Multi-layer | 28 | 33% |
| Example 3 | NCM1811 | Multi-layer | 28 | 64% |

Referring to Table 1, it may be confirmed that when comparing Comparative Examples 1 and 3 and Examples 1 and 3 in each which a thick-film-structured cathode of the same thickness is introduced, the lithium secondary batteries of Examples 1 and 3 in which different cathode active materials are arranged in a certain order while including a cathode active material layer having a multi-layer structure exhibit excellent lifespan characteristics as compared with the lithium secondary battery of Comparative Example 1 having a single layer structure, as well as the lithium secondary battery of Comparative Example 3 in which the arranging order is reversed. In particular, it may be confirmed that the lithium secondary battery of Comparative Example 3 stacked in a direction opposite to the direction in which the content of Ni decreases as it goes away from the cathode current collector defined in the preferred stacking order in the present invention has poorer lifespan characteristics than the lithium secondary battery of Comparative Example 1 having a single-layer structure. This is considered because a cathode active material having a low Ni content is advantageous in terms of lifespan characteristics, and a cathode active material having a high Ni content is advantageous in terms of capacity characteristics, but effects to be realized are not sufficiently realized due to different stacking orders.

Further, it may be confirmed that the lithium secondary battery of Example 1 having a triple layer structure in which an additional layer is added may exhibit more excellent effect of improving lifespan characteristics as compared with the lithium secondary battery of Example 3 having a double layer structure.

Meanwhile, it may be confirmed that the lithium secondary batteries of Example 2 and Comparative Example 2 are each provided with a thin-film cathode structure rather than a thick-film cathode structure, so an lifespan improvement effect according to the introduction of a multi-layer cathode structure is exhibited in a thin-film structure as well as a thick-film structure. However, such an improvement effect is small compared to the case of the thick film structure, which is considered to be because the cathode of the thin-film structure does not have a significant decrease in lifespan.

Example 4

(Manufacture of Cathode)

96 wt % of $LiNi_{0.8}Mn_{0.1}Co_{0.1}O_2$ as a first cathode active material, 2 wt % of super-p as a conductive material, and 2 wt % of polyvinylidene fluoride as a binder were mixed to prepare a first composition. The first composition was applied onto an aluminum (Al) thin film having a thickness of about 20 μm, which is a cathode current collector, dried at about 80° C. for 20 minutes, and then roll-pressed to obtain a cathode coated with a first layer.

A second composition obtained by mixing 95 wt % of $LiCoO_2$ as a second cathode active material and 5 wt % of polyvinylidene fluoride as a binder was applied onto the first layer to form a second layer. Then, the second layer was dried at about 80° C. for 20 minutes to prepare a double-coated cathode. In this case, the loading of the first layer is about 5.25 mg/cm², the loading of the second layer is about 12.25 mg/cm², and the loading ratio of the first layer and the second layer is 3:7. Meanwhile, the current density of the cathode including the first layer and the second layer was 3.0 mAh/cm². The content ratio of the first cathode active material and second cathode active material in the cathode was 7:3.

(Manufacture of Anode)

98 wt % of graphite as an anode active material and 2 wt % of a binder was mixed, introduced into distilled water, and then dispersed for 60 minutes using a mechanical stirrer to prepare an anode active material composition. The anode active material composition was applied to a thickness of about 60 μm onto a copper current collector having a thickness of 10 μm using a doctor blade, dried for 0.5 hours in a hot air dryer at 100° C., dried once again for 4 hours under conditions of vacuum and 120° C., and then rolled to manufacture an anode in which an anode active material layer is formed on the copper current collector.

(Preparation of Electrolyte)

7 wt % of fluoroethylene carbonate (FEC) was added to a mixed solvent of ethylene carbonate (EC), propylene carbonate (PC), ethyl propionate (EP) and propylene propionate (PP) at a volume ratio of 2:1:2:5, including 1.15M $LiPF_6$ as a lithium salt, to prepare an electrolyte for lithium secondary batteries.

(Assembly of Lithium Secondary Battery)

A lithium secondary battery was manufactured using the cathode, the anode, a ceramic-coated polyethylene separator having a thickness of 18 μm, and the electrolyte. In this case, the operating voltage of the lithium secondary battery was 3.0 to 4.35 V.

Example 4-1

A lithium secondary battery was manufactured in the same manner as in Example 4, except that the content of the first cathode active material and the content of the second cathode active material were adjusted such that the current density of the cathode is 2.6 mAh/cm². In this case, the operating voltage of the lithium secondary battery was 3.0 to 4.35 V. The content ratio of the first cathode active material and second cathode active material in the cathode was 7:3.

Example 4-2

A lithium secondary battery was manufactured in the same manner as in Example 4, except that the content of the first cathode active material and the content of the second cathode active material were adjusted such that the current density of the cathode is 3.4 mAh/cm². In this case, the operating voltage of the lithium secondary battery was 3.0 to 4.35 V. The content ratio of the first cathode active material and second cathode active material in the cathode was 7:3.

Example 4-3

A lithium secondary battery was manufactured in the same manner as in Example 4, except that the operating voltage of the lithium secondary battery was adjusted to 3.0 to 4.4 V. The content ratio of the first cathode active material and second cathode active material in the cathode was 7:3.

Example 5

A lithium secondary battery was manufactured in the same manner as in Example 1, except that the loading of the first layer was about 8.75 mg/cm², the loading of the second layer was about 8.75 mg/cm², and the loading ratio of the first layer and the second layer was adjusted to about 5:5. The content ratio of the first cathode active material and second cathode active material in the cathode was 5:5.

Comparative Example 4

(Manufacture of Cathode)

28.8 wt % of $LiNi_{0.8}Mn_{0.1}Co_{0.1}O_2$ as a first cathode active material, 67.2 wt % of $LiCoO_2$ as a second cathode active material, 2 wt % of super-p as a conductive material, and 2 wt % of polyvinylidene fluoride as a binder were mixed to prepare a cathode composition. The cathode composition was applied onto an aluminum (Al) thin film having a thickness of about 20 μm, which is a cathode current collector, dried at about 80° C. for 20 minutes, and then roll-pressed to obtain a cathode. In this case, the thickness of the cathode active material layer was about 40 am. Further, the current density of the cathode was 3.0 mAh/cm².

(Manufacture of Anode)

The anode used in Example 4 was used.

(Preparation of Electrolyte)

The electrolyte used in Example 4 was used.

(Assembly of Lithium Secondary Battery)

A lithium secondary battery was manufactured using the cathode, the anode, a ceramic-coated polyethylene separator having a thickness of 18 μm, and the electrolyte. In this case, the operating voltage of the lithium secondary battery was 3.0 to 4.35 V.

Comparative Example 4-1

A lithium secondary battery was manufactured in the same manner as in Comparative Example 4, except that the content of the first cathode active material and the content of the second cathode active material were adjusted such that the current density of the cathode is 2.6 mAh/cm². In this case, the operating voltage of the lithium secondary battery was 3.0 to 4.35 V.

Comparative Example 4-2

A lithium secondary battery was manufactured in the same manner as in Comparative Example 4, except that the content of the first cathode active material and the content of the second cathode active material were adjusted such that the current density of the cathode is 3.4 mAh/cm², In this case, the operating voltage of the lithium secondary battery was 3.0 to 4.35 V.

Comparative Example 4-3

A lithium secondary battery was manufactured in the same manner as in Comparative Example 4, except that the operating voltage of the lithium secondary battery was adjusted to 3.0 to 4.4 V.

Comparative Example 5

A lithium secondary battery was manufactured in the same manner as in Example 1, except that 48 wt % of $LiNi_{0.8}Mn_{0.1}Co_{0.1}O_2$ as a first cathode active material, 48 wt % of $LiCoO_2$ as a second cathode active material, 2 wt % of super-p as a conductive material, and 2 wt % of polyvinylidene fluoride as a binder were mixed to prepare a cathode composition.

Evaluation Example 3: Evaluation of Discharge Profile

Figure 9:
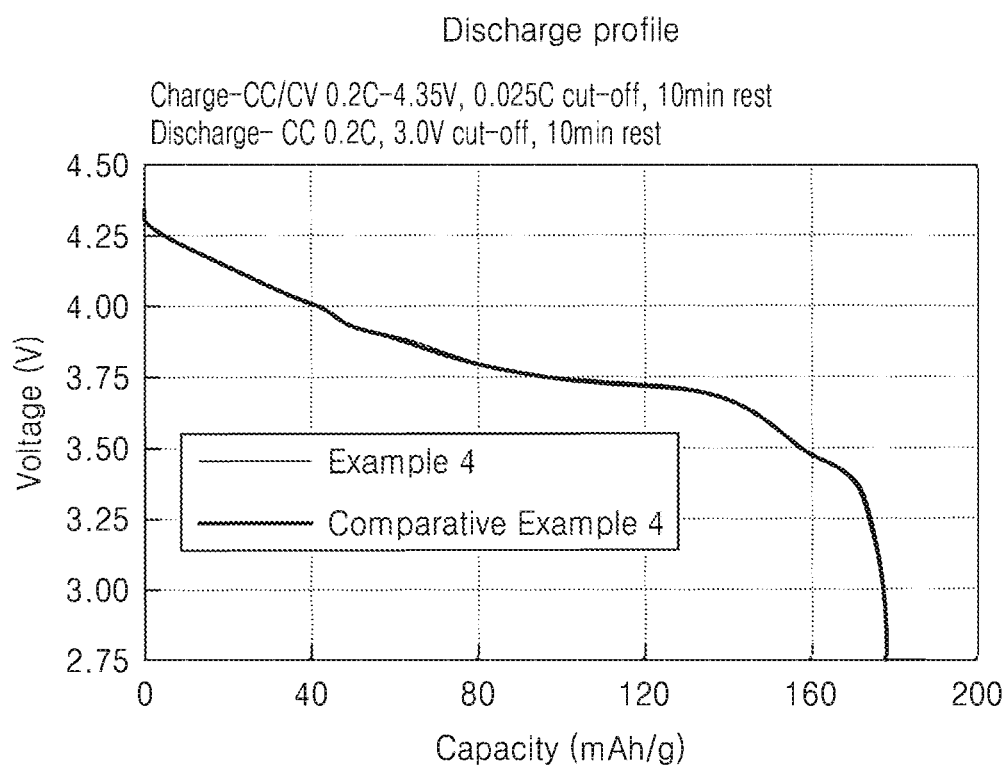
FIG. 9 is a graph illustrating the results of a discharge profile of a lithium secondary battery to which the cathodes manufactured in Example 4 and Comparative Example 4 are applied.

The lithium secondary batteries manufactured in Example 4 and Comparative Example 4 were charged under charging conductions (constant current/constant voltage of 0.2 C/4.35V, cutoff current of 0.025 C, rest for 10 minutes) and was discharged under discharging conditions (constant voltage of 0.2 C, cutoff voltage of 3.0V, rest for 10 minutes), and discharge profiles thereof were measured and were shown in FIG. 9.

Referring to FIG. 9, it may be confirmed that although the lithium secondary battery according to Example 4 includes LCO, which has relatively poor capacity characteristics, in the cathode active material while applying the multi-layered cathode active material, this secondary battery exhibits a discharge capacity of a level not significantly lower than that of the lithium secondary battery according to Comparative Example 4 to which an NCM-based cathode active material was applied.

Evaluation Example 4: Evaluation of Cycle Characteristics

Figure 10:
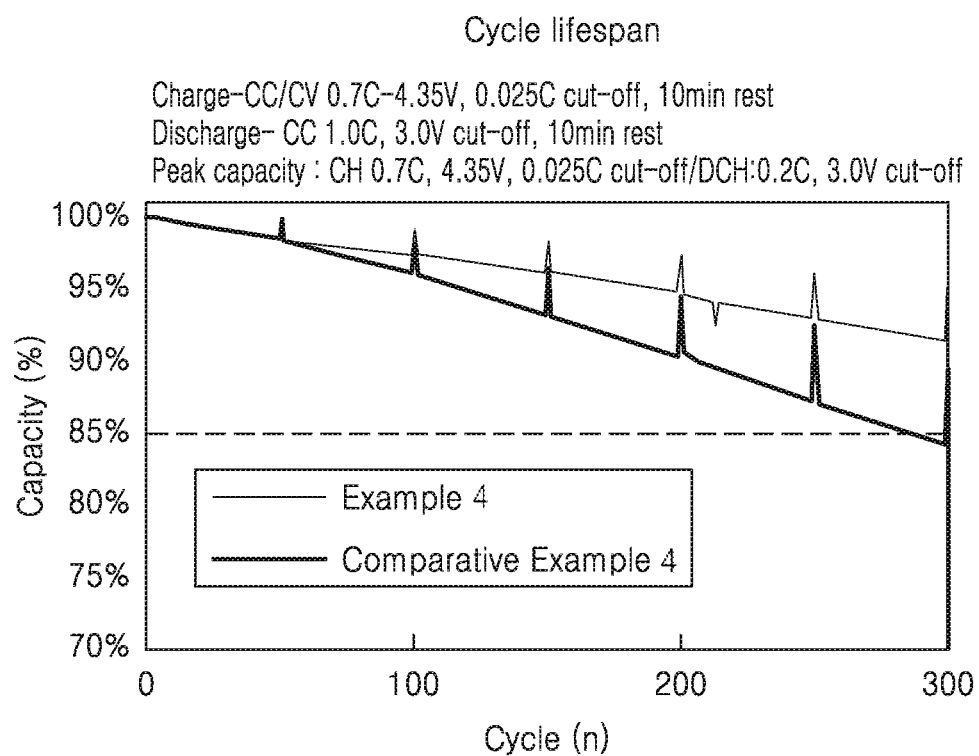
FIG. 10 is a graph illustrating the cycle lifespan of a lithium secondary battery to which the cathodes manufactured in Example 4 and Comparative Example 4 are applied.

The lithium secondary batteries manufactured in Example 4 and Comparative Example 4 were charged under charging conductions (constant current/constant voltage of 0.7 C/4.35V, cutoff current of 0.025 C, rest for 10 minutes) and was discharged under discharging conditions (constant voltage of 1.0 C, cutoff voltage of 3.0V, rest for 10 minutes), and capacities thereof during 300 cycles were measured and were shown in FIG. 10.

Referring to FIG. 10, it may be confirmed that the lithium secondary battery according to Example 4 better maintains capacity characteristics as the number of cycles increases, compared to the lithium secondary battery according to Comparative Example 4. That is, it may be confirmed that even when the LCO-based material and the NOM-based material are included in the same amount, compared to the lithium secondary battery according to Comparative Example 4 in which the LCO-based material and the NCM-based material are simply mixed, the lithium secondary battery according to Example 4 in which these materials are included in a predetermined order exhibits excellent cycle characteristics.

Meanwhile, the capacity retention rates (lifespan) of Examples 4-1 to 4-3, Example 5, Comparative Examples 4-1 to 4-3, and Comparative Example 5 as well as Example 4 and Comparative Example 4 after 300 cycles were measured under the same conditions, and the measurement results are shown in Table 2 below.

TABLE 2

|  | NCM/LCO ratio | Current density (mAh/cm²) | Driving voltage (V) | Lifespan(@ 300cyc) |
| --- | --- | --- | --- | --- |
| Comparative Example 4 | 3/7 | 3.0 | 3.0~4.35 | 90% |
| Example 4 | 3/7 | 3.0 | 3.0~4.35 | 95% |
| Comparative Example 4-1 | 3/7 | 2.6 | 3.0~4.35 | 95% |
| Example 4-1 | 3/7 | 2.6 | 3.0~4.35 | 95% |
| Comparative Example 4-2 | 3/7 | 3.4 | 3.0~4.35 | 81% |
| Example 4-2 | 3/7 | 3.4 | 3.0~4.35 | 92% |
| Comparative Example 4-3 | 3/7 | 3.0 | 3.0~4.4 | 83% |
| Example 4-3 | 3/7 | 3.0 | 3.0~4.4 | 95% |
| Comparative Example 5 | 5/5 | 3.0 | 3.0~4.35 | 76% |
| Example 5 | 5/5 | 3.0 | 3.0~4.35 | 88% |

Referring to Table 2, it may be confirmed a even when the same content ratio of NCM (first positive active material) and LCO (second positive active material) is applied, the lithium secondary batteries of Examples in which NCM and LCO are arranged in a multi-layer structure of a certain order exhibit excellent lifespan characteristics under the same conditions as compared with lithium secondary batteries of Comparative Examples in which NCM and LCO are simply mixed. In addition, it may be confirmed that in spite of changes in current density, driving voltage, and NCM/LCO ratio, the lithium secondary batteries of the Examples have little or no change in lifespan characteristics, whereas the lithium secondary batteries of Comparative Examples in which NCM and LCO are simply mixed have a large deterioration in lifespan characteristics. Heretofore, preferred embodiments according to the present disclosure have been described with reference to the drawings and examples, but it will be understood that this is only an example, and various modifications and equivalent other embodiments are possible therefrom by those of ordinary skill in the art. Accordingly, the protection scope of the present disclosure should be defined by the appended claims.

INDUSTRIAL APPLICABILITY

A lithium secondary battery according to an embodiment employs a cathode having a novel layer structure, thereby improving lifespan characteristics.

The invention claimed is:

1. A cathode for secondary batteries, the cathode comprising:
   a cathode current collector;
   a first layer disposed on at least one surface of the cathode current collector and including a first cathode active material;
   a second layer disposed on the first layer and including a second cathode active material, and
   a third layer disposed on the second layer and including a third cathode active material,
   wherein the first cathode active material is represented by Formula 1 below,
   the second cathode active material is represented by Formula 1 or Formula 2 below,
   the third cathode active material is represented by Formula 1, and
   the first cathode active material, the second cathode active material, and the third cathode active material are different from each other:

$$Li_xNi_yM_{1-y}O_2 \quad \text{<Formula 1>}$$

$$Li_\alpha Co_\beta M'_{1-\beta}O_2 \quad \text{<Formula 2>}$$

in the above Formulas,
   $0.9 \leq x \leq 1.2$, $0.1 \leq y \leq 0.98$,
   $0.9 \leq \alpha \leq 1.2$, $0 \leq \beta \leq 1.0$, and
   M and M' are each independently at least one metal or transition metal element having an oxidation number of $^+2$ or $^+3$.

2. The cathode of claim 1, wherein M and M' are each independently at least one element selected from Al, Mg, Mn, Co, Fe, Cr, V, Ti, Cu, B, Ca, Zn, Zr, Nb, Mo, Sr, Sb, W, and Bi.

3. The cathode of claim 1, wherein the first cathode active material is represented by Formula 1A below, and the second cathode active material is represented by Formula 1B below:

$$Li_{x1}Ni_{y1}M1_{1-y1}O_2 \quad \text{<Formula 1A>}$$

in the above Formula, $$Li_{x2}Ni_{y2}M1_{1-y2}O_2 \quad \text{<Formula 1B>}$$

in the above Formula, for definitions of M1, x1, y1, M2, x2, and y2, refer to the definitions for M, x, and y in claim 1, and
   y1>y2.

4. The cathode of claim 1, wherein
   the first cathode active material is represented by Formula 1-1 or Formula 1-2,
   the second cathode active material is represented by Formula 1-1 or Formula 1-2 or is LiCoO$_2$, and
   the first cathode active material and the second cathode active material are different from each other:

$$Li_{x'}Ni_{y'}Co_{1-y'-z'}Al_{z'}O_2 \quad \text{<Formula 1-1>}$$

$$Li_{x'}Ni_{y'}Co_{1-y'-z'}Mn_{z'}O_2 \quad \text{<Formula 1-2>}$$

in Formulas 1-1 and 1-2, $0.9 \leq x' \leq 1.2$, $0.1 \leq y' \leq 0.98$, $0<z'<0.5$, and $0<1-y'-z'<0.5$.

5. The cathode of claim 1, wherein a content of Ni in the first cathode active material is 0.6 mol or more based on a total number of moles of transition metals.

6. The cathode of claim 1, wherein when the second cathode active material is represented by Formula 1, a content of Ni in the second cathode active material is 0.6 mol or less based on a total number of moles of transition metals.

7. The cathode of claim 1, wherein a weight ratio of the first cathode active material and the second cathode active material is 3:7 to 7:3.

8. The cathode of claim 1, wherein an active material loading ratio of the first layer to the second layer is 3:7 to 7:3.

9. The cathode of claim 1, wherein a current density ratio of the first layer to the second layer is 2:8 to 8:2.

10. The cathode of claim 1, wherein a thickness ratio of the first layer to the second layer is 2:8 to 8:2.

11. The cathode of claim 1, wherein an active material loading of the first layer is 3 mg/cm$^2$ to 40 mg/cm$^2$.

12. The cathode of claim 1, wherein an active material loading of the second layer is 3 mg/cm$^2$ to 40 mg/cm$^2$.

13. The cathode of claim 1, wherein a current density of the cathode is 2 to 10 mAh/cm$^2$.

14. The cathode of claim 1, wherein
    the first cathode active material is represented by Formula 1A below, the second cathode active material is represented by Formula 1B below, and the third cathode active material is represented by Formula 1C:

$$Li_{x1}Ni_{y1}M1_{1-y1}O_2 \quad \text{<Formula 1A>}$$

in the above Formula, $$Li_{x2}Ni_{y2}M2_{1-y2}O_2 \quad \text{<Formula 1B>}$$

$$Li_{x3}Ni_{y3}M3_{1-y3}O_2 \quad \text{<Formula 1C>}$$

in the above Formulas, for definitions of M1, x1, y1, M2, x2, y2, M3, x3, and y3, refer to the definitions for M, x, and y in claim 1, and
    y1>y2>y3.

15. The cathode of claim 1, wherein a current density of the third layer is less than or equal to a current density of the second layer, and the current density of the second layer is less than or equal to a current density of the first layer.

16. The cathode of claim 1, wherein a cathode active material layer including the first layer and the second layer has a thickness of 40 μm or more.

17. The cathode of claim 1, wherein the sum of a content of the first cathode active material and a content of the second cathode active material is 80 to 98 wt % based on a total weight of the cathode.

18. A lithium secondary battery comprising:
    the cathode of claim 1;
    an anode disposed to face the cathode; and
    an electrolyte disposed between the cathode and the anode.

19. The lithium secondary battery of claim 18, an operation voltage of the lithium secondary battery is 2.5 to 4.5 V.

* * * * *